May 12, 1942.  C. SCHROEDER  2,282,985
MOTOR DRIVEN TROLLEY
Filed Jan. 24, 1940   3 Sheets-Sheet 1
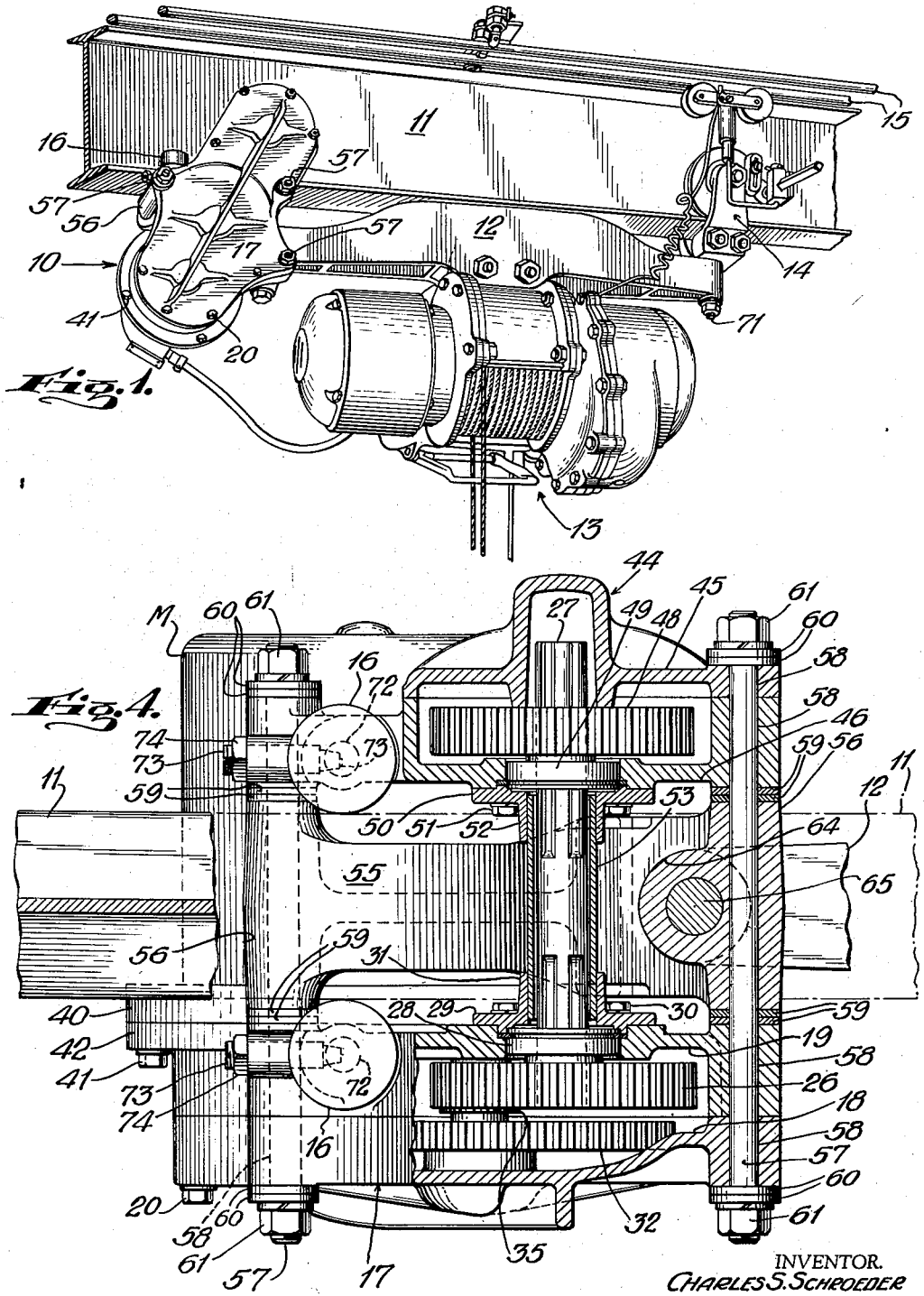
INVENTOR.
CHARLES S. SCHROEDER
BY
ATTORNEY.

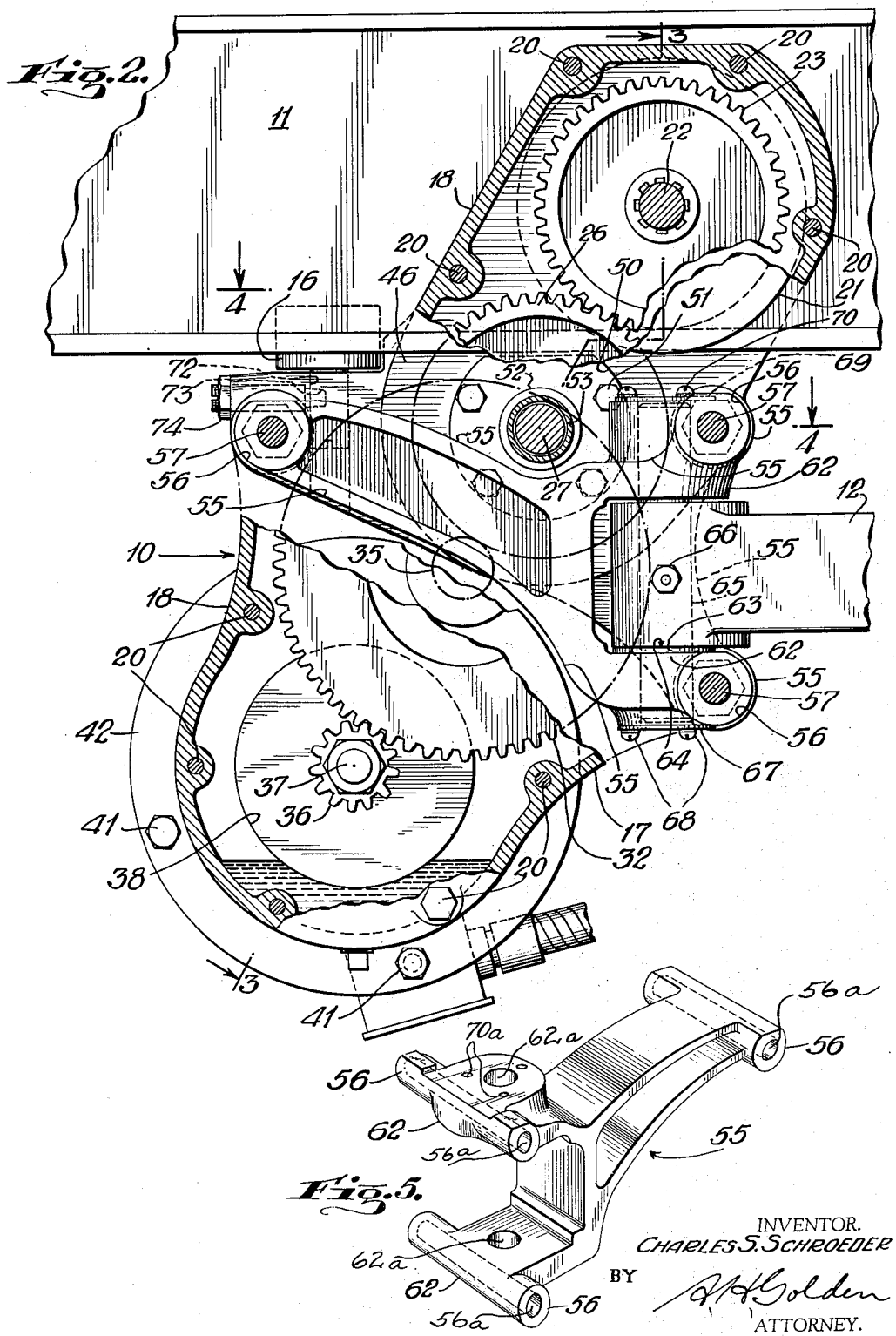

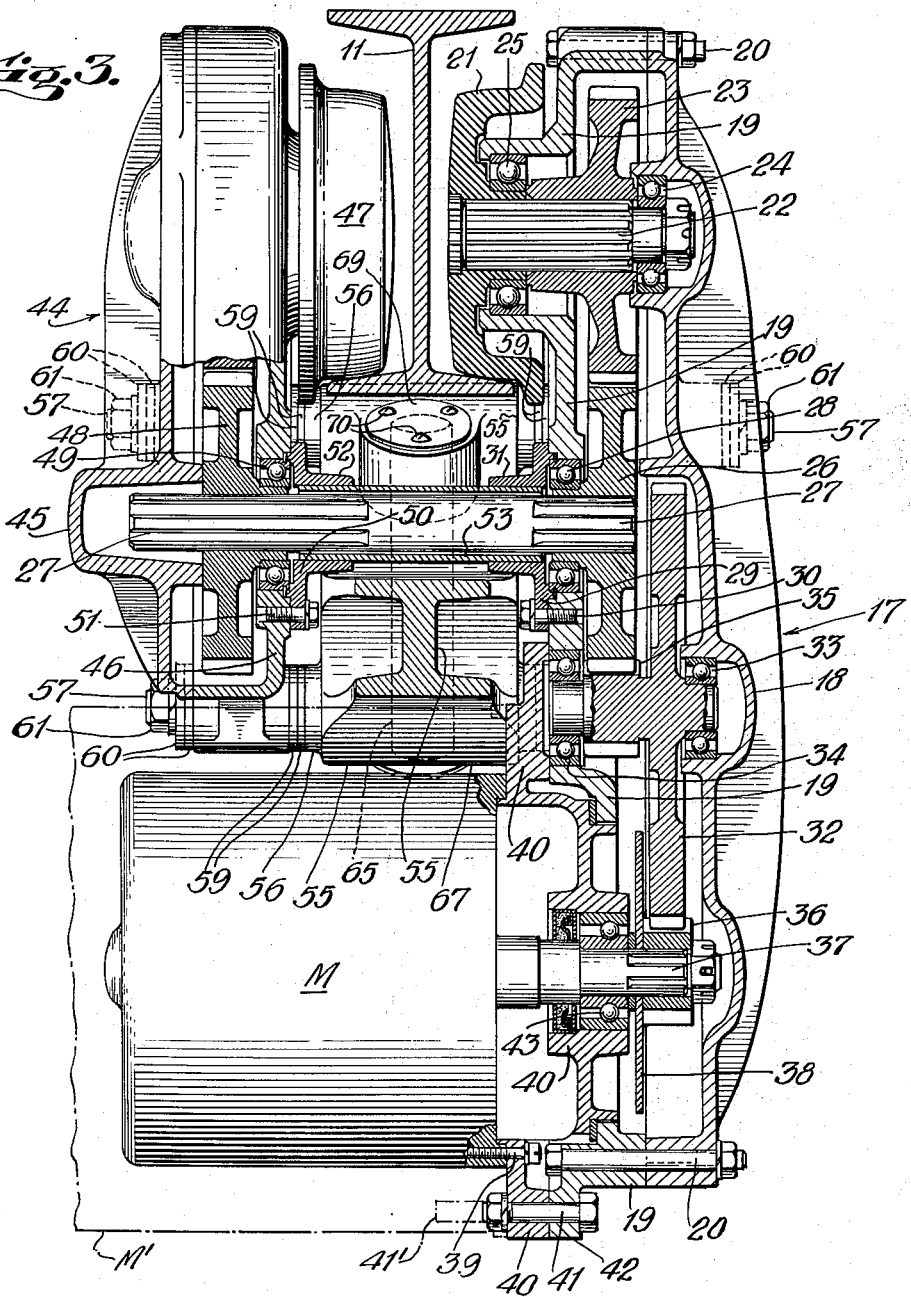

Patented May 12, 1942

2,282,985

UNITED STATES PATENT OFFICE 2,282,985

MOTOR DRIVEN TROLLEY

Charles Schroeder, Philadelphia, Pa., assignor to The Yale & Towne Manufacturing Company, Stamford, Conn., a corporation of Connecticut Application January 24, 1940, Serial No. 315,342

17 Claims. (Cl. 105—154)

This invention relates to a motor driven trolley of the type adapted for supporting and moving hoisting mechanism over an I-beam track.

More particularly, my invention relates to a motor driven trolley which may be adjusted for use with varying sizes of I-beams. It is a feature of my invention that my motor driven trolley may be adjusted for varying widths of I-beams without in any way affecting the relationship of the vital parts of the trolley. Thus, adjustments may be made without varying the relationship of the trolley wheels relatively to the gearing which drives them, or of the motor relatively to the gearing through which the trolley wheels are driven. Similarly, because of my construction, the trolley assembly has practically the same rigidity, strength, and efficiency when extended for use on larger size I-beams as when operated with a small size I-beam, all of which will appear in the specification which follows.

More in detail, the trolley of my invention embodies a trolley wheel cooperable with one side of an I-beam, and driven by a set of gears actuated by a motor, and a trolley wheel cooperable with the other side of the I-beam and also actuated by a set of gears. I arrange for means to connect the two sets of gears in various spaced positions of the trolley wheels, so that the two wheels are driven at the same speed by a motor which drives the gears of the first trolley wheel. This result is preferably obtained through the provision of a shaft which extends from the gearing of one of the trolley wheels into operating relation to the gearing of the second trolley wheel, and is preferably in sliding relationship to the gearing of the second trolley wheel.

Considering the invention even more in detail, I utilize a pair of gear casings, one of which has attached thereto a motor for driving the gears in the said casing. Each of the gear casings has, of course, a trolley wheel driven by the gears therein. I extend a shaft from the gears in one of the gear casings into sliding cooperation with a gear in the other of the gear casings. This makes it possible to drive the trolley wheels of the two casings at the same speed by proper arrangement of the gears, and with the casings in different spaced positions. By securing the two gear casings in said different spaced positions, I am able to accommodate the trolley to I-beams of various sizes.

I have thus described generally only the main features of my invention, and it will be understood after reading the specification that there are other features thereof which are of importance, and which are included in the patent monopoly for which I am asking. Also, it should be appreciated that the basic contribution of my invention is capable of embodiment in many different mechanical structures, and that I should not therefore be limited in my monopoly except as may be required by the state of the art.

Referring now to the drawings, Fig. 1 is a perspective view of my motor driven trolley in assembled relation to an I-beam and a hoist of the wire rope type. Fig. 2 is a partial section and elevation of my motor driven trolley with certain parts removed to better show other parts. Fig. 3 is a section along lines 3—3 of Fig. 2, while Fig. 4 is a section along lines 4—4 of Fig. 2. Fig. 5 is a perspective view of the trolley adaptor.

Referring now more particularly to the drawings, and especially Fig. 1, I show a motor driven trolley 10 supported for movement on an I-beam 11, and itself carrying one end of a hoist supporting beam 12. The hoist supporting beam 12 has suitably secured thereto in a manner known in the art, a wire rope hoist 13, that end of the hoist supporting beam 12 opposite the motor driven trolley being supported by a trolley 14. Power for the hoist 13 and the motor driven trolley 10 is obtained from a pair of wires 15 by current collectors carried by the trolley 14 in the usual way known in the art. The trolley wheels which form part of the motor driven trolley 10 cannot be seen in Fig. 1, but one of the guide wheels 16 carried by the motor driven trolley and cooperating with the edge of the flange of the I-beam 11 is shown in Fig. 1.

Referring now to Figs. 2, 3 and 4, I have shown in detail the construction of my motor driven trolley. Viewing especially Fig. 3, at the right I show the main gear casing 17 which is formed of a cover plate 18 and a base plate 19. A suitable series of bolts of varying lengths, all designated by reference numeral 20, serve to hold the cover and base plates 18 and 19 respectively, in assembled relation.

The trolley wheel carried by the main gear casing 17 is designated by reference numeral 21, and is splined to the shaft 22. A gear 23 is also splined to the shaft 22 for rotation therewith. A ball bearing assembly 24 supports one end of the shaft on the cover plate 18, while the other end of the shaft is supported through the intermediary of the trolley wheel 21 and ball bearing assembly 25 relatively to the base plate 19. Cooperation of the trolley wheel 21 with the I-beam 11 is well illustrated in Fig. 3.

A second gear, which I shall term a central gear, is designated by reference numeral 26, and is forced on to the end of a splined shaft 27. This shaft 27 and its gear 26 are supported at one end by the ball bearing assembly 28 relatively to the base plate 19. A bearing retainer 29 is bolted through a series of bolts 30 to the base plate 19 and serves to hold the ball bearing 28 in assembled relation to the base plate 19. The bearing retainer has a sleeve portion designated by reference numeral 31, the function of which will be described later.

A third gear is mounted within the main casing 17, and is designated by reference numeral 32. This gear is supported through a ball bearing 33 on the cover plate 18, and through a ball bearing 34 on the base plate 19. The gear 32 is formed integrally with a pinion 35, which pinion is in mesh with the central gear 26 previously described. The gear 32 is driven by a pinion 36 which is splined and secured to the motor shaft 37. Mounted also on the motor shaft 37 and within the main casing 17 is what I term an oil splasher 38, which is in the form of a disk utilized for throwing oil from the bottom of the casing upwardly, as is probably best appreciated from Fig. 2.

The motor shaft 37 forms part of a motor, designated generally by the letter M, and secured by a series of bolts 39 to an adaptor plate 40. This adaptor plate 40 is in turn secured by a series of bolts 41 to a flange 42 forming part of the base plate 19. The adaptor plate 40 is so formed that a portion thereof carries the ball bearing assembly 43 which supports the motor shaft 37 relatively to the main gear casing 17. The upper portion of the adaptor plate 40 forms a cover for the ball bearing 34 which supports the gear 32, all as is best seen from Fig. 3.

When the adaptor is secured to base plate 19 through the series of bolts 41, it actually forms part of the base plate 19 and may be considered as part of that plate. Where it is desired to use a larger motor M', designated by the dot and dash lines in Fig. 3, another form of adaptor 40 may be utilized, as is shown in this figure, eliminating the series of bolts 39 and utilizing longer bolts 41' extending from the base plate 19 inwardly into the motor casing.

A secondary gear casing is designated by me with reference numeral 44, and is formed of a cover plate 45 and a base plate 46. The trolley wheel 47 associated with this gear casing 44, is mounted relatively to that casing just as the trolley wheel 21 is mounted on its casing, and is similarly driven. The gear in the casing 44, which corresponds to the central gear 26 of the casing 17, is designated by reference numeral 48 and is suitably mounted on a ball bearing 49 in the base plate 46. The ball bearing 49 is retained by a bearing retainer 50, similar in construction to the bearing retainer 29 of the ball bearing 28, and similarly held mounted by a series of bolts 51. The retainer 50 has a flange 52 similar to the flange 31 of the retainer 29. The splined shaft 27 is in splined and sliding relationship to the central gear 48 of the gear casing 44, so that the central gear 48 is driven at the same speed as is the central gear 26 of the casing 17, and therefore drives the trolley wheel 47 at the same speed as is driven the trolly wheel 21.

A protecting sleeve 53 is maintained in protecting and covering relation to the splined shaft 27 by the sleeve portions 21 and 52 of the bearing retainers 29 and 50, respectively. It will now be readily appreciated that the main casing 17 and the secondary casing 44 may be moved into different spaced relationships without disturbing in any way the relationship of the various parts of the trolley, or affecting the driving relationship of the shaft 27 and the gears 26 and 48. Moreover, it will be appreciated that the relationship of the trolley wheels 21 and 47 relatively to any I-beam on which they may be mounted will be the same as the relationship shown in Fig. 3.

I shall now disclose the construction of what I term an adaptor, which is utilized for assembling the main and secondary gear casings relatively to one another in different spaced relationships. The adaptor which I so utilize is shown in perspective in Fig. 5 and is shown in its assembled position in Fig. 2. It is designated by reference numeral 55, and for convenience, in Fig. 2 I show the reference numeral 55 applied to several of the surfaces of the adaptor in order that its outline there may be readily traced.

It will be noted that each of the three corners of the substantially triangular adaptor is formed as a sleeve 56 which is bored at 56a for the passage of a bolt 57. The main and secondary casings 17 and 44, respectively, and their base and cover plates are each also formed with three bores 58 adapted to align with the bores 56a of the three sleeves 56 of the adaptor 55 for the passage of the bolts 57. In the drawings, Fig. 4, I have shown the adaptor separated from both the main and secondary casings by pairs of washers, designated by reference numeral 59, these washers being positioned on each of the three shafts 57 and at each side of the three sleeve portions 56 of the adaptor.

Similarly, at the extreme opposite ends of each of the bolts 57, I show a pair of washers 60. I further show nuts 61 at the opposite ends of each of the shafts 57. These nuts 61 maintain assembled on the shafts 57, the outside pairs of washers 60, the main and secondary casings 17 and 44 respectively, the inner washers 59, and the adaptor sleeves 56. It will be readily appreciated that should it be desired to adjust the particular assembly for a narrower I-beam 11, it would merely be necessary to remove one or both of the inner washers 59 on each of the shafts 57 and place those washers next to the outside washers 60. We would then have a narrower assembly adapted for a narrower I-beam. Naturally, the splined and sliding relationship of shaft 27 to gear 48 makes it possible to drive trolley wheel 47 in all adjusted speed positions of the gear casings.

Should it be desired to have a wider assembly adapted for a wider I-beam, it would merely be necessary to place the outside washers 60 in juxtaposed relation to the inside washers 59 on the shaft 57, thus increasing the space between the main and secondary gear casings, all as will be apparent. It is emphasized again that this change in spacing between the main and auxiliary casings will not in any way affect the relationship of the trolley wheels 21 and 47 relatively to the gearing which drives those trolley wheels. Also, there will be no change in the relationship between the trolley wheels, the I-beam on which they are mounted, and their casings. Adjustment will be simple and requires no expert mechanical labor.

As is best noted in Fig. 2, the adaptor 55 carries the hoist supporting beam 12. Thus, the upper and lower right hand sleeve portions 56 shown in Fig. 2, are actually part of a pair of spaced ears 62, the lower one of which supports through thrust washer 63 the rounded end 64 of the hoist supporting beam 12. The upper and lower ears 62 are bored at 62a for the passage of a king pin 65 which traverses also a bore in the end 64 of the beam 12 whereby the beam 12 may pivot relatively to the adaptor 55 as the adaptor moves with the motor driven trolley on the I-beam 11. This construction is required in order that the hoist be transported on curved I-beams.

A Zerk lubrication nipple is provided at 66 whereby grease may be supplied to the king pin 65. A lower cover plate 67 for the king pin bore in the adaptor is held by a series of screws 68 threaded into the lower adaptor ear 62, and a similar cover plate 69 is held in place by screws 70 inserted into the threaded holes 70a of the upper ears 62.

The right hand end of the hoist supporting beam is suitably supported from a king pin 71, which king pin is in turn carried by the trolley assembly 14, all as will be appreciated by those skilled in the art. It may be well to indicate here that broadly, the use of adaptors and washers to adjust simple trolleys such as trolley 14 is old in the art.

For guiding the motor trolley assembly relatively to the I-beam 11, there are carried by the main and secondary casings the rollers 16 shown in Figs. 1, 2 and 4. Each of the rollers 16 is carried on a shaft 72, which in turn is retained by a centering and retaining bolt 73 held in position by a lock nut 74, all as is apparent from the drawings. It may be well to indicate at this point that the motor trolley assembly is maintained in the angular position shown best in Figs. 1 and 2, through the use of the hoist supporting beam 12 cooperating with the adaptor 55, and that this relationship of the parts makes for a minimum of spacing between the trolley wheels of the motor trolley and the trolley wheels of the trolley 14, all as will be readily appreciated.

I now claim:

1. In a trolley of the class described, a motor, a trolley wheel cooperable with one side of an I-beam, gearing between said motor and trolley wheel and driven by said motor to rotate said trolley wheel, a second trolley wheel cooperable with the other side of said I-beam, gearing whereby said second trolley wheel is similarly driven by said motor, a shaft extending under said I-beam and through the medium of which said gearings are actuated simultaneously by said motor, means whereby the effective length of said shaft is adjustable to compensate for different spaced positions of said gearings as determined by different I-beam widths, and means for maintaining said gearings and trolley wheels in different spaced positions.

2. In a trolley of the class described, a motor, a trolley wheel cooperable with one side of an I-beam, gearing between said motor and trolley wheel and driven by said motor to rotate said trolley wheel, a second trolley wheel cooperable with the other side of said I-beam, gearing whereby said second trolley wheel is driven, and a shaft extending functionally between said gearings for driving said trolley wheels simultaneously by said motor, means of engagement between said shaft and the gearing of at least one of said trolley wheels whereby said shaft drives said second trolley wheel through its gearing in different spaced positions of said first and second gearings as determined by different I-beam widths, and means for maintaining said first and second gearings and trolley wheels in said different spaced positions.

3. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, means whereby said shaft drives said second trolley through its gearing when said first and secondary casings are in different spaced positions as determined by different I-beam widths, and means for securing said casings in said different spaced positions.

4. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, sliding means of engagement between said shaft and the gearing of at least one of said trolley wheels whereby said shaft drives said second trolley wheel through its gearing in different spaced positions of said first and secondary casings as determined by different I-beam widths, and means for securing said casings in said different spaced positions.

5. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft functionally extending between the gearing in one of said casings and the gearing in the other of said casings whereby to drive said second trolley wheel together with said first trolley wheel, means whereby said shaft drives said second trolley through its gearing when said first and secondary casings are in different spaced positions as determined by different I-beam widths, and means for securing said gear casings in said several different spaced positions.

6. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley, sliding means of engagement between said shaft and the gearing of at least one of said trolley wheels whereby said shaft drives said second trolley wheel through its gearing in different spaced positions of said first and secondary casings as determined by different I-beam widths, and means for securing said gear casings in said several different spaced positions.

7. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, means whereby said shaft drives said second trolley through its gearing when said first and secondary casings are in different spaced positions as determined by different I-beam widths, an adaptor secured between and to said gear casings for maintaining them in said different spaced positions, a king pin carried by said adaptor, and a hoist carrying beam mounted at one end on said king pin.

8. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, means whereby said shaft drives said second trolley through its gearing when said first and secondary casings are in different spaced positions as determined by different I-beam widths, an adaptor between said gearing casings having at least three sleeve portions, bolts traversing the sleeve portions of said adaptor and corresponding portions of said gear casings, and spacers on said bolts for fixing the spacing between said gear casings in accordance with said different spaced positions.

9. In a trolley of the class described, a motor, a trolley wheel cooperable with one side of an I-beam, gearing between said motor and trolley wheel and driven by said motor to rotate said trolley wheel, a second trolley wheel cooperable with the other side of said I-beam, gearing whereby said second trolley wheel is driven, a shaft extending from and driven by said first trolley wheel gearing for driving said second trolley wheel through its gearing, sliding means of engagement between said shaft and the gearing of at least one of said trolley wheels whereby said shaft drives said second trolley wheel through its gearing in different spaced positions of said first and second gearings as determined by different I-beam widths, and an adaptor secured between and to said gearings for maintaining them in said different spaced positions.

10. In a trolley of the class described, a motor, a trolley wheel cooperable with one side of an I-beam, gearing between said motor and trolley wheel and driven by said motor to rotate said trolley wheel, a second trolley wheel cooperable with the other side of said I-beam, gearing whereby said second trolley wheel is driven, a shaft extending from and driven by said first trolley wheel gearing for driving said second trolley wheel through its gearing, sliding means of engagement between said shaft and the gearing of at least one of said trolley wheels whereby said shaft drives said second trolley wheel through its gearing in different spaced positions of said first and second gearings as determined by different I-beam widths, an adaptor between said gearings, bolts traversing bores of said adaptor and portions of said gearings, and spacers on said bolts cooperable with said adaptor for fixing the spacing between said gearings in accordance with said different spaced positions.

11. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft secured to a gear in said main casing and extending into said secondary casing, a gear in said secondary casing of the same size as said gear to which said shaft is secured, sliding means of engagement between said shaft and said gear in the secondary casing, and a protective sleeve for said shaft secured between said casings.

12. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, means whereby said shaft drives said second trolley wheel through its gearing when said first and secondary casings are in different spaced positions as determined by different I-beam widths, an adaptor between said gear casings, a pair of vertically spaced ears formed on said adaptor, a shaft extending between said ears, and a hoist beam supported on the lower of said ears and pivoted on said shaft relatively to said adaptor.

13. In a trolley of the class described, a main casing, gearing within said casing, a trolley wheel driven by said gearing and cooperating with one side of an I-beam, a motor for driving said gearing and said trolley wheel, a secondary casing, gearing within said secondary casing, a trolley wheel driven by said gearing in said secondary casing and cooperating with the other side of said I-beam, a shaft extending from the gearing in one of said casings to the gearing in the other of said casings whereby to drive said second trolley wheel together with said first trolley wheel, means whereby said shaft drives said second trolley wheel through its gearing when said first and secondary casings are in different spaced positions as determined by different I-beam widths, an adaptor between said gear casings, a pair of vertically spaced ears formed on said adaptor, a shaft extending between said ears, a hoist beam supported on the lower of said ears and pivoted on said shaft relatively to said adaptor, said ears having transverse bores formed therein, and bolts traversing said bores and corresponding bores in said gear casings for securing said gear casings in said different spaced positions.

14. In a trolley of the class described, a gear casing, meshing gears in said casing, a trolley wheel extending from said casing and driven by said gears, an adaptor plate forming part of said casing, a motor secured to said adaptor plate, a bearing for the shaft of said motor formed on said adaptor plate, and means for securing said adaptor plate to said casing.

15. In a trolley of the class described, a gear casing, meshing gears in said casing, a trolley wheel extending from said casing and driven by said gears, an adaptor plate forming part of said casing, a motor secured to said adaptor plate and having a shaft extending therefrom, a pinion for driving said gears formed on said shaft, a bearing for the shaft formed on said adaptor plate between the motor and said pinion, and means for securing said adaptor plate to said casing with said pinion within the casing as completed by said adaptor plate, and said motor outward of said casing.

16. In a trolley of the class described, a casing, gearing in said casing, a trolley wheel driven by said gearing and cooperating with one side of an I-beam, a secondary casing, gearing within said secondary casing, a trolley wheel driven by the gearing in said secondary casing and cooperating with the other side of said I-beam, an adaptor for securing said casings in different spaced positions relatively to one another depending on the width of the said I-beam, a motor for driving said trolley wheels through said gearing, and means for making a driving connection between said gearings in said different spaced positions of said casings whereby said motor drives both said trolley wheels in all of said different spaced positions.

17. In a trolley of the class described, a casing, gearing in said casing, a trolley wheel driven by said gearing and cooperating with one side of an I-beam, a secondary casing, gearing within said secondary casing, a trolley wheel driven by the gearing in said secondary casing and cooperating with the other side of said I-beam, an adaptor for securing said casings in different spaced positions relatively to one another depending on the width of the said I-beam, a motor for driving said trolley wheels through said gearing, and means for making a driving connection between both said gearings and said motor in said different spaced positions of said casings, comprising a drive shaft in driven relation to said motor and in sliding engagement with the gearing in at least one of said casings for driving the said gearing in said different spaced positions.

CHARLES SCHROEDER.